June 19, 1934.   E. L. GREENSFELDER   1,963,438
METHOD AND APPARATUS FOR PRODUCING FILM FOR
PROJECTING STEREOSCOPIC MOTION PICTURES
Original Filed Sept. 21, 1929   2 Sheets-Sheet 1
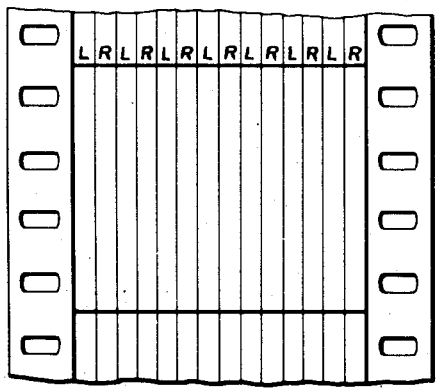
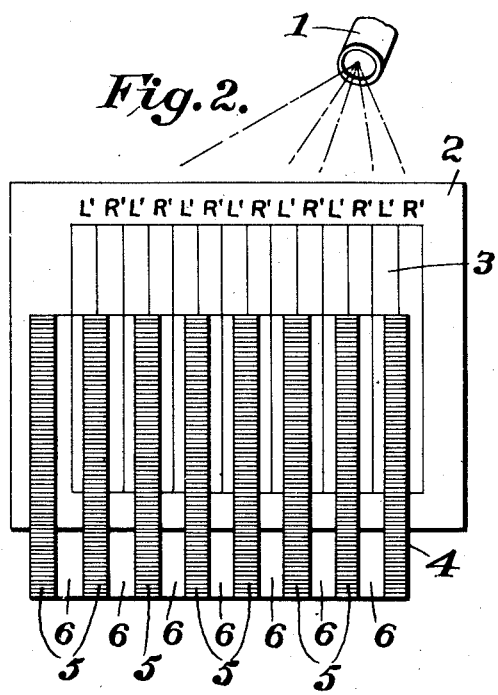
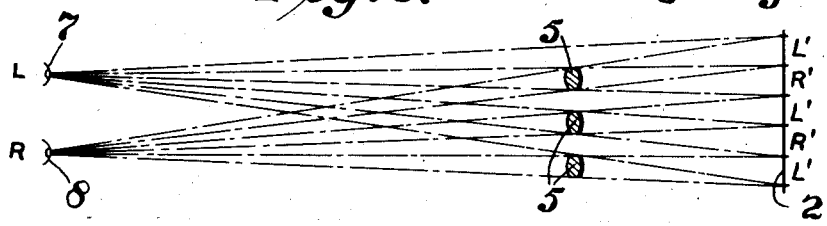
Inventor:
Elmer L. Greensfelder,
By   Spear, Donaldson + Hall
Attys.

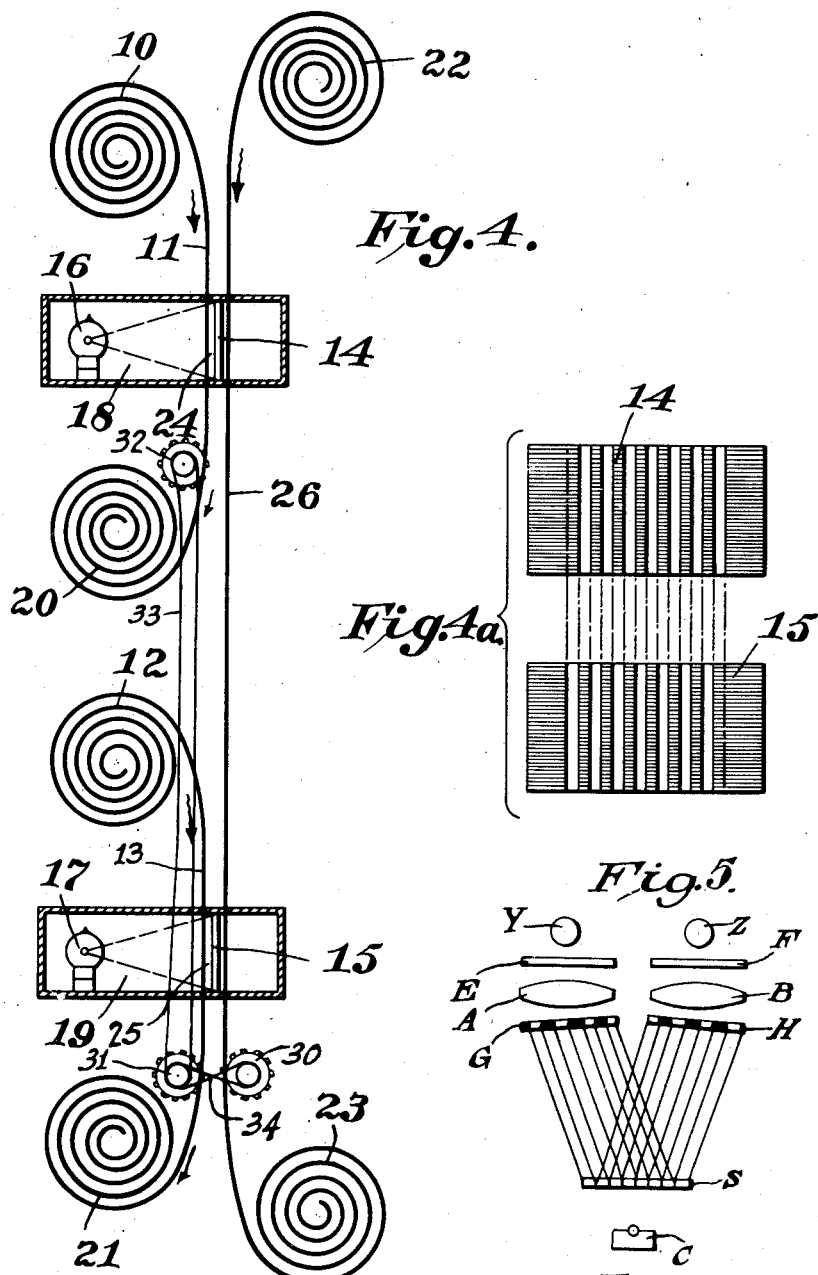

Patented June 19, 1934

1,963,438

UNITED STATES PATENT OFFICE 1,963,438

METHOD AND APPARATUS FOR PRODUCING FILM FOR PROJECTING STEREOSCOPIC MOTION PICTURES

Elmer L. Greensfelder, Baltimore, Md.

Original application September 21, 1929, Serial No. 394,316. Divided and this application November 13, 1930, Serial No. 495,507

7 Claims. (Cl. 88—16.6)

This application is a division of my copending application Serial No. 394,316, filed September 21, 1929 for Method and apparatus for photographing and stereoscopically projecting motion pictures.

The invention relates to method and apparatus for producing a film for use in obtaining stereoscopic effect in motion pictures and to novel forms of film produced in carrying out the method.

An object of the invention is to provide novel method and apparatus for making a film capable of producing stereoscopic relief in motion pictures without the necessity of the viewer holding a device in front of his eye, such as is the case, for example, when looking through a stereoscope. The method and apparatus contemplates the production of a novel single film of standard size for effecting this purpose.

In the accompanying diagrammatic drawings which are illustrative of the invention, Figure 1 is a diagram of a portion of a film made according to my invention for use in a motion picture projecting apparatus.

Figure 2 is a perspective view in the nature of a diagram indicating the method of projecting the picture to get the stereoscopic relief.

Figure 3 is a diagrammatic plan view of the projection screen, the bars in front thereof, and the lines of vision from the eyes of the observer located in front of the screen.

Figure 4 is a diagrammatic view in elevation of apparatus for making a film like Fig. 1.

Fig. 4a is a detail front view of the gratings of Fig. 4 taken at right angles to the position shown in Fig. 4.

Fig. 5 is a diagrammatic view indicating the projection, combining, and recording of films to produce the film of Fig. 1.

In all of the diagrams the proportions and relative distances are exaggerated for the sake of clearness.

My method is to record on the film alternating slices or sections of right and left views, adjacent to one another, as shown in Fig. 1, and to project them on to a screen, from either behind the screen or from in front. In front of the projection screen is a series of vertical rods, bars, obstructions, or grating (henceforth referred to as "bars"), preferably translucent or opaque, so placed that they allow the viewer, sitting in front of the screen and in front of the bars, to see the projected picture in stereoscopic relief, due to the fact that the bars prevent the left eye from seeing the right eye sections of the projected pictures, but do not prevent the right eye from seeing them, and the bars prevent the right eye from seeing the left eye sections of the projected pictures, but do not prevent the left eye from seeing them. In other words, the spaces between the bars do not block off the right views from the right eye, or the left views from the left eye, but the bars block the right views from the left eye and the left views from the right eye. Each eye, seeing only the view intended for it, results in stereoscopic relief.

The strips marked L in Figure 1 are sections of the left eye view, and the strips marked R are sections of the right eye view. The distance between the lens that photographs the left view and the lens that photographs the right view is preferably equivalent approximately to the distance between a person's right eye and left eye. The strips of right and left views that adjoin each other are complementary sections.

Fig. 2 shows a perspective view of the method whereby the picture is projected to give stereoscopic relief. The proportions and relative distances are exaggerated for clearness. 1 is the projecting camera behind the screen 2, this screen being made of material which allows of the projected picture 3, using the film shown in Fig. 1, showing through on the reverse side; 4 is a frame holding a series of vertical bars, obstructions or grating 5 with intervening spaces 6. In the actual apparatus, there are preferably more bars 5, spaces 6, and projected sections L' and R' than are here shown.

When the picture is projected from behind the screen as in Fig. 2, the film, of course, must then be run through the projecting machine laterally reversed so that when viewed from the front of the screen, images will have their normal position. English printing, for example, will read to the audience from left to right, and not right to left.

It will be understood that the drawings are purely diagrammatic in character and that the invention is in no way limited to the relative widths of the bars with relation to the projected sections L', R' as shown in Figure 2. Preferably, the bars are slightly more narrow in width than said projected sections. Nor is the invention in any way limited to the number of bars and sections shown in the drawings. The spaces between the bars should be preferably substantially equal in width to the bars themselves, but I do not desire to limit myself to this.

Fig. 3 is a plan view of part of Fig. 2 in more detail, showing how the bars 5 keep the left eye 7 from seeing the right views R', and how they keep the right eye 8 from seeing the left views L'. At the same time, it will be seen that the bars 5 do not prevent the left eye from seeing the left views, or the right eye from seeing the right views.

Regarding the method of making a film with alternating right and left sections, such as shown in Fig. 1, there are several ways that this can be done. My preferred method is indicated in Fig. 4. This method has the advantage of allowing of the left view negative and the right view negative both being the same distance from the undeveloped positive during the process of recording on to the positive film the right view sections and the left view sections in alternating and adjacent strips.

Referring to Fig. 4, coil 10 contains a developed normal negative film 11 and coil 12 contains a developed normal negative film 13. The pictures on film 11 and on film 13 are of the same subject and differ only in that the lens of the camera that photograph film 11 was distant from the lens that photographed film 13 by the distance approximately equivalent to the distance between the right eye and the left eye. Film 11, therefore, contains the right eye view, and film 13 the left eye view. 14 and 15 are gratings on glass or of other material consisting of alternating vertical black, (or opaque) strips and transparent strips (or open spaces). 14 and 15 are so arranged and placed that a black strip on grating 14 if continued vertically downward will coincide with transparent strip or space on grating 15 and be of the same width, and similarly a transparent strip or space on grating 14 if continued vertically downward would coincide with a black strip on grating 15 and be of the same width.

The position of the black strips on grating 14 correspond on a reduced scale with the position of the bars 5 on Fig. 2. 16 and 17 are light sources in housings 18 and 19 respectively. 22 is a coil of undeveloped film 26 on which the positive containing alternating right and left sections is to be made. It winds up on coil 23.

In making the positive, the undeveloped film 26 unwinds from coil 22 under the action of sprocket 30, passes spaces 24 and 25 and winds up on coil 23. At the same time, the developed negative 11, containing right eye views, unwinds from coil 10 under the action of sprocket 32 in the direction of the arrow, passes space 24, and winds up on coil 20. As the negative film 11 passes space 24, the light from 16 passes through film 11 and grating 14, causing the composite image of grating 14 and the picture on film 11 at that place to be recorded on the exposed section of film 26 at that position. Similarly the developed negative 13, containing the left eye views, unwinds from coil 12 under the action of sprocket 31, passes space 25 and winds up on coil 21. As the film 13 passes space 25, the light from 17 passes through film 13 and grating 15, causing the composite image of grating 15 and the picture on 13 at that place to be recorded on the exposed section of film 26 at that position.

Sprockets 30, 31, and 32 drive the films 26, 13 and 11 at the same speed, and are themselves driven as by the belt 33 between 31 and 32 and the crossed belt 34 between 31 and 30.

The transparent spaces of grating 14 allow of sections of 11 being photographed or printed on film 26 and the black lines on grating 14 leave unexposed strips on film 26 on which are photographed or printed the sections of 13 that are not obstructed by the black lines on grating 15; i. e., that pass through the transparent spaces of grating 15, and thus a positive, such as shown in Fig. 1, is obtained containing alternately corresponding sections of the left eye and the right eye views.

The films 11, 13, and 26 are all moving at the same speed, and they can be moved intermittently all at the same time or continuously all at the same time. The grating 14 is preferably between the film 11 and the film 26. Similarly the grating 15 is preferably between the film 13 and the film 26.

Coils 10 and 12 are so wound and arranged that the right eye view which is exposed to the film 26 at 24 corresponds to the left view which is exposed to the same frame section of film 26 at 25.

In all cases the distances between films 11 and 26 at 24 and films 13 and 26 at 25 are to be preferably the same.

It will be noted that the black strips on grating 14 and 15 eliminate from the final picture in Fig. 1 the 1st, 3d, 5th, etc., strips from the original right eye view on film 11 and eliminate the 2nd, 4th, 6th, etc., strips from the original left eye view on film 13. This specification is intended to cover also a final picture, such as in Fig. 1, where no slices or sections of either left or right strips are omitted; that is, the 1st, 3d, 5th, etc., strips of Fig. 1 can embrace every consecutive strip of a film showing a complete left eye view, and the 2nd, 4th, 6th, etc., strips of Fig. 1 can embrace every consecutive strip of a film showing a complete right eye view.

An alternative way of projecting, as shown in Fig. 5 is to use the grating in front of the film (lens) while projecting the pictures, these pictures not being divided up on the film into sections, but being complete and the gratings serving to divide the projected images into sections. In this case, two projecting lenses A and B are employed, through one of which is projected by light source Y the complete left eye positive film E and through the other by light source Z the complete right eye positive film F, and there are no transparent spaces or strips on the film.

The two pictures are projected on to the same screen S and are divided up into strips by each being projected through similar gratings G and H, the two gratings being placed so that the sections of the left eye view which reach the screen are alternated side by side of the complementary sections of the right eye view which reach the screen, the resulting view on the screen having the appearance of the film in Fig. 1.

This being the case, there will be stereoscopic relief when the projected picture on screen S is viewed from in front through the bars 5 of Fig. 2, for the effect is the same as projecting the film of Fig. 1 on the screen, and the bars allow the right eye only to see the right views and the left eye only to see the left views.

Both of the lenses could be housed in one projecting machine, and either a separate right view film and a separate left view film could be used as shown, or one film containing the complete right views and the complete left views juxtaposed side by side could be used, the contiguous edges of E and F simply joined together. The picture thus thrown on the screen from two lenses through gratings could be photographed by another recording camera C, and thus would give another way of producing sectioned film such as shown in Fig. 1 for use in projecting to obtain stereoscopic relief.

Or the projected sectioned right and left views from the spaced lenses may be made to fall directly on an undeveloped film in a camera as by removing the screen S in Fig. 5, instead of first falling on a screen and then being photographed.

I do not limit myself to only the details described above, as minor modifications might be manifest, which would be included in the spirit of this invention as set forth.

It will be understood that where in reference to the drawings, and in the claims, a normal negative developed film is referred to as to be used in producing a positive on an undeveloped final film, that the designations as positive and negative are purely relative terms. That is, the term "normal negative developed film" includes within its scope any normal developed film, and the term "undeveloped positive film" includes within its meaning any undeveloped film upon which the developed film view is to be recorded.

I do not desire to limit myself to the spacing apart of the lenses the distance between the eyes as this distance may be increased or decreased considerably without departing from the scope of the invention.

I claim:

1. The method of producing a film for producing stereoscopic motion pictures having alternating complementary adjoining sections of right and left views taken by spaced camera lenses, comprising forming developed right and left eye views taken by spaced camera lenses, projecting said views through gratings upon a screen by spaced lenses so that the sectioned right and left views fall on the screen into complementary and alternating position, and photographing the resulting picture to produce said film.

2. The method according to claim 1 which comprises forming said developed right and left eye views upon one film with the complete right and left views juxtaposed side by side.

3. The method of producing a film for producing stereoscopic motion pictures having alternating complementary adjoining sections of right and left views taken by spaced camera lenses, comprising forming developed right and left eye views taken by spaced camera lenses, projecting said views through gratings by spaced lenses upon an undeveloped film in a camera so that the sectioned right and left views are photographed on the film in complementary and alternating position.

4. In combination in apparatus for producing a film for producing stereoscopic motion pictures, a pair of barred gratings disposed in spaced apart relation in the same plane with the bars extending in the same direction, the bars in one of said gratings being staggered with respect to the bars in the other grating and being in alignment with the spaces between the bars of said other grating, means for moving one of a pair of normal developed films taken of the same subject by spaced camera lenses past one of said gratings, means for moving the other of said pair of normal developed films past the other of said gratings, means for simultaneously moving an undeveloped film past said pair of gratings, light means disposed to shine through each of said normal developed films and its corresponding grating onto said undeveloped film, said means for moving said normal developed films being relatively so adjusted in respect to the distance between the gratings as to record the corresponding views of said normal developed films upon the same section of said undeveloped film.

5. The method of producing a film for producing stereoscopic motion pictures, said film having alternating complementary adjoining sections of right and left views taken by spaced camera lenses, comprising forming developed right and left eye views taken by spaced camera lenses, projecting said views through gratings by spaced lenses so that the projected spaced sections of the one eye view are complementary to the projected spaced sections of the corresponding other eye view, and recording the projected view sections upon the same frame of an undeveloped film in complementary alternating relation.

6. The method of producing a film for producing stereoscopic motion pictures, said film having alternating complementary adjoining sections of right and left eye views, comprising forming right and left eye views, projecting said views through gratings by spaced lenses so that the projected spaced sections of the one eye are complementary to the projected spaced sections of the corresponding other eye view, and recording the projected view sections upon the same frame of an undeveloped film in complementary alternating relation.

7. The method of producing a film for producing stereoscopic motion pictures, said film having alternating complementary adjoining sections of right and left eye views, comprising forming right and left eye views, separately projecting said views through spaced gratings so that the projected spaced sections of the one eye view are complementary to the projected space sections of the corresponding other eye view, and recording the projected view sections upon the same frame of an undeveloped film in complementary alternating relation.

ELMER L. GREENSFELDER.